United States Patent
Hardwicke, Jr. et al.

(10) Patent No.: US 10,570,882 B2
(45) Date of Patent: Feb. 25, 2020

(54) DYNAMIC ACTIVE AND REACTIVE POWER CAPABILITY FOR WIND FARMS

(71) Applicant: General Electric Company, Schenectady, NY (US)

(72) Inventors: Edward Wayne Hardwicke, Jr., Greenville, SC (US); Robert Gregory Wagoner, Roanoke, VA (US); Harold Robert Schnetzka, Simpsonville, SC (US); Samir Salamah, Niskayuna, NY (US); Rajni Kant Burra, Clifton Park, NY (US); Vaidhya Nath Venkitanarayanan, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 15/810,269

(22) Filed: Nov. 13, 2017

(65) Prior Publication Data
US 2019/0145376 A1 May 16, 2019

(51) Int. Cl.
*F03D 7/02* (2006.01)
*F03D 7/04* (2006.01)
(Continued)

(52) U.S. Cl.
CPC .......... *F03D 7/028* (2013.01); *F03D 7/0272* (2013.01); *F03D 7/048* (2013.01); *H02J 3/386* (2013.01);
(Continued)

(58) Field of Classification Search
CPC .................................... F03D 7/02; F03D 7/04
See application file for complete search history.

(56) References Cited

U.S. PATENT DOCUMENTS

| 6,906,431 B2 | 6/2005 | Wobben |
|---|---|---|
| 6,924,565 B2 | 8/2005 | Wilkins et al. |

(Continued)

FOREIGN PATENT DOCUMENTS

| CN | 100561857 C | 11/2009 |
|---|---|---|
| CN | 103457270 A | 12/2013 |

(Continued)

OTHER PUBLICATIONS

Pulgar-Painemal, Basics of DFIG Power Generation, Department of Electrical, University Tennessee, https://www.researchgate.net/publication/236863791_Basics_of_DFIG_power_generation, May 29, 2013.

(Continued)

*Primary Examiner* — Mark A Connolly
(74) *Attorney, Agent, or Firm* — Dority & Manning, P.A.

(57) ABSTRACT

A control method for dynamically controlling active and reactive power capability of a wind farm includes obtaining one or more real-time operating parameters of each of the wind turbines. The method also includes obtaining one or more system limits of each of the wind turbines. Further, the method includes measuring at least one real-time wind condition at each of the wind turbines. Moreover, the method includes continuously calculating an overall maximum active power capability and an overall maximum reactive power capability for each of the wind turbines as a function of the real-time operating parameters, the system limits, and/or the real-time wind condition. Further, the method includes generating a generator capability curve for each of the wind turbines using the overall maximum active and reactive power capabilities and communicating the generator capability curves to a farm-level controller of the wind farm that can use the curves to maximize the instantaneous power output of the wind farm.

20 Claims, 5 Drawing Sheets

(51) Int. Cl.
*H02J 3/38* (2006.01)
*H02J 3/48* (2006.01)
*H02J 3/50* (2006.01)

(52) U.S. Cl.
CPC ............ *H02J 3/48* (2013.01); *H02J 3/50* (2013.01); *F05B 2270/1033* (2013.01); *F05B 2270/303* (2013.01); *F05B 2270/304* (2013.01); *F05B 2270/32* (2013.01); *F05B 2270/321* (2013.01)

(56) References Cited

U.S. PATENT DOCUMENTS

| | | | |
|---|---|---|---|
| 7,884,492 | B2 | 2/2011 | Xiong et al. |
| 7,994,658 | B2 | 8/2011 | Cardinal et al. |
| 8,247,917 | B2 | 8/2012 | Yasugi et al. |
| 8,432,052 | B2 | 4/2013 | Lu et al. |
| 8,664,800 | B2 | 3/2014 | Galbraith et al. |
| 8,694,169 | B2 | 4/2014 | Lovmand et al. |
| 8,934,270 | B2 | 1/2015 | Letas |
| 9,334,851 | B2 | 5/2016 | Kumar |
| 9,382,898 | B2 | 7/2016 | Teodorescu et al. |
| 9,496,812 | B2 | 11/2016 | Kragelund et al. |
| 9,556,852 | B2 | 1/2017 | Babazadeh et al. |
| 9,588,557 | B2 | 3/2017 | Wilkins et al. |
| 9,617,976 | B2 | 4/2017 | Edenfeld |
| 9,716,384 | B2 | 7/2017 | Alonso Sadaba et al. |
| 9,780,710 | B2 | 10/2017 | Rose, Jr. et al. |
| 2008/0150283 | A1 | 6/2008 | Rivas et al. |
| 2010/0025994 | A1 | 2/2010 | Cardinal et al. |
| 2011/0133461 | A1 | 6/2011 | Hjort |
| 2011/0198846 | A1 | 8/2011 | Wakasa et al. |
| 2012/0136494 | A1 | 5/2012 | Kirchner et al. |
| 2013/0168963 | A1* | 7/2013 | Garcia ............... H02J 3/18 290/44 |
| 2014/0062086 | A1 | 3/2014 | Mata Dumenjo et al. |
| 2015/0267683 | A1* | 9/2015 | Ubben ............... F03D 7/00 290/44 |
| 2015/0275862 | A1 | 10/2015 | Babazadeh et al. |
| 2015/0340870 | A1 | 11/2015 | Ilo |
| 2016/0308369 | A1 | 10/2016 | Gupta et al. |
| 2017/0244251 | A1 | 8/2017 | Nielsen et al. |

FOREIGN PATENT DOCUMENTS

| | | |
|---|---|---|
| CN | 203942292 U | 11/2014 |
| CN | 102882229 B | 6/2015 |
| CN | 105762838 A | 7/2016 |
| CN | 105914758 A | 8/2016 |
| CN | 106684881 A | 5/2017 |
| EP | 2166266 A1 | 3/2010 |
| EP | 2 863 512 A1 | 4/2015 |
| EP | 2 933 478 A1 | 10/2015 |
| WO | WO 99/07996 A1 | 2/1999 |
| WO | WO 2009/083446 A2 | 7/2009 |
| WO | WO2012/016585 A1 | 2/2012 |
| WO | WO2014/071948 A1 | 5/2014 |
| WO | WO 2015/086022 A1 | 6/2015 |

OTHER PUBLICATIONS

Pulgar-Painemal et al., Doubly-Fed Induction Machine in Wind Power Generation, University of Illinois at Urbana-Champaign, https://www.researchgate.net/publication/249994749_Doubly-fed_induction_machine_in_wind_power_generation, Jul. 2009.

Hurajt, Simulation of a Wind Energy Conversion System Utilizing a Vector Controlled Doubly Fed Induction Generator, Electronic Theses and Dissertations, 4979, 2013. http://scholar.uwindsor.ca/etd/4979.

Merahi, et al., Control Algorithm of Active and Reactive Power Generation for Wind Farm, ICEEAC International Conference on Electrical Engineering and Automatic Control, Nov. 2013.

EP Search Report, dated Feb. 12, 2019.

* cited by examiner

DYNAMIC ACTIVE AND REACTIVE POWER CAPABILITY FOR WIND FARMS

FIELD

The present disclosure relates generally to wind farms having a plurality of wind turbines, and more particular to systems and methods for determining dynamic active and reactive power capability for wind farms.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity. In addition, a plurality of the wind turbines may be arranged in a predetermined geological location and electrically connected together to form a wind farm.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology.

The DFIG can be configured to provide both active or real power (measured in Watts) and reactive power (measured in VARs). For example, by controlling the switching cycle of the rotor side converter, the real and reactive power generated by the stator can be controlled. Similarly, by controlling a switching cycle of the line side converter, the real and reactive power generated by the rotor can be controlled. Thus, the combined amount of reactive power generated by the DFIG wind turbine system can be controlled to meet a reactive power production requirement, such as a reactive power production requirement set by a dispatch control system of a utility company. In a typical configuration, the stator of a DFIG can be configured to supply the reactive power for the system unless the stator runs out of current margin, in which case, the line side converter can be used to help make reactive power to meet the reactive power production requirement.

In a wind farm, the wind is not pushed consistently across the farm at any instant in time but rather some wind turbines see high wind at a moment in time while others see much less wind at that same time. Thus, the present disclosure is directed to systems and methods for determining dynamic real and reactive power capability for wind farms that takes into account the changing wind.

BRIEF DESCRIPTION

Aspects and advantages of the invention will be set forth in part in the following description, or may be obvious from the description, or may be learned through practice of the invention.

In one aspect, the present disclosure is directed to a control method for dynamically controlling real and reactive power capability of a wind farm having a plurality of wind turbines. Each of the plurality of wind turbines has a Doubly-Fed Induction Generator (DFIG) and a power converter. Each power converter has a line side converter and a rotor side converter. The control method includes obtaining, by a control device comprising one or more processors and one or more memory devices, one or more real-time operating parameters of each of the wind turbines. The method also includes obtaining, by the control device, one or more system limits of each of the wind turbines. Further, the method includes measuring, via one or more sensors, at least one real-time wind condition at each of the wind turbines. Moreover, the method includes continuously calculating, by the control device, an overall maximum active power capability and an overall maximum reactive power capability for each of the wind turbines as a function of the one or more real-time operating parameters, the one or more system limits, and the at least one real-time wind condition. In addition, the method includes generating, by the control device, a generator capability curve for each of the wind turbines using the overall maximum active and reactive power capabilities and a power curve. Thus, the method includes communicating the generator capability curves for each of the wind turbines to a farm-level controller of the wind farm and controlling, via the farm-level controller, the wind farm based on the generator capability curves.

In another aspect, the present disclosure is directed to a control system for a wind turbine. The wind turbine has a DFIG and a power converter. The power converter has a line side converter and a rotor side converter. The control system includes one or more processors and one or more memory devices. Further, the control system is configured to perform one or more operations, including but not limited to obtaining one or more real-time operating parameters of each of the wind turbines, obtaining one or more system limits of each of the wind turbines, obtaining at least one real-time wind condition at each of the wind turbines, continuously calculating an overall maximum active power capability and an overall maximum reactive power capability for each of the wind turbines as a function of the one or more real-time operating parameters, the one or more system limits, and the at least one real-time wind condition, generating a generator capability curve for each of the wind turbines using the overall maximum active and reactive power capabilities and a power curve, and communicating the generator capability curves for each of the wind turbines to a farm-level controller of the wind farm.

Variations and modifications can be made to these example embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
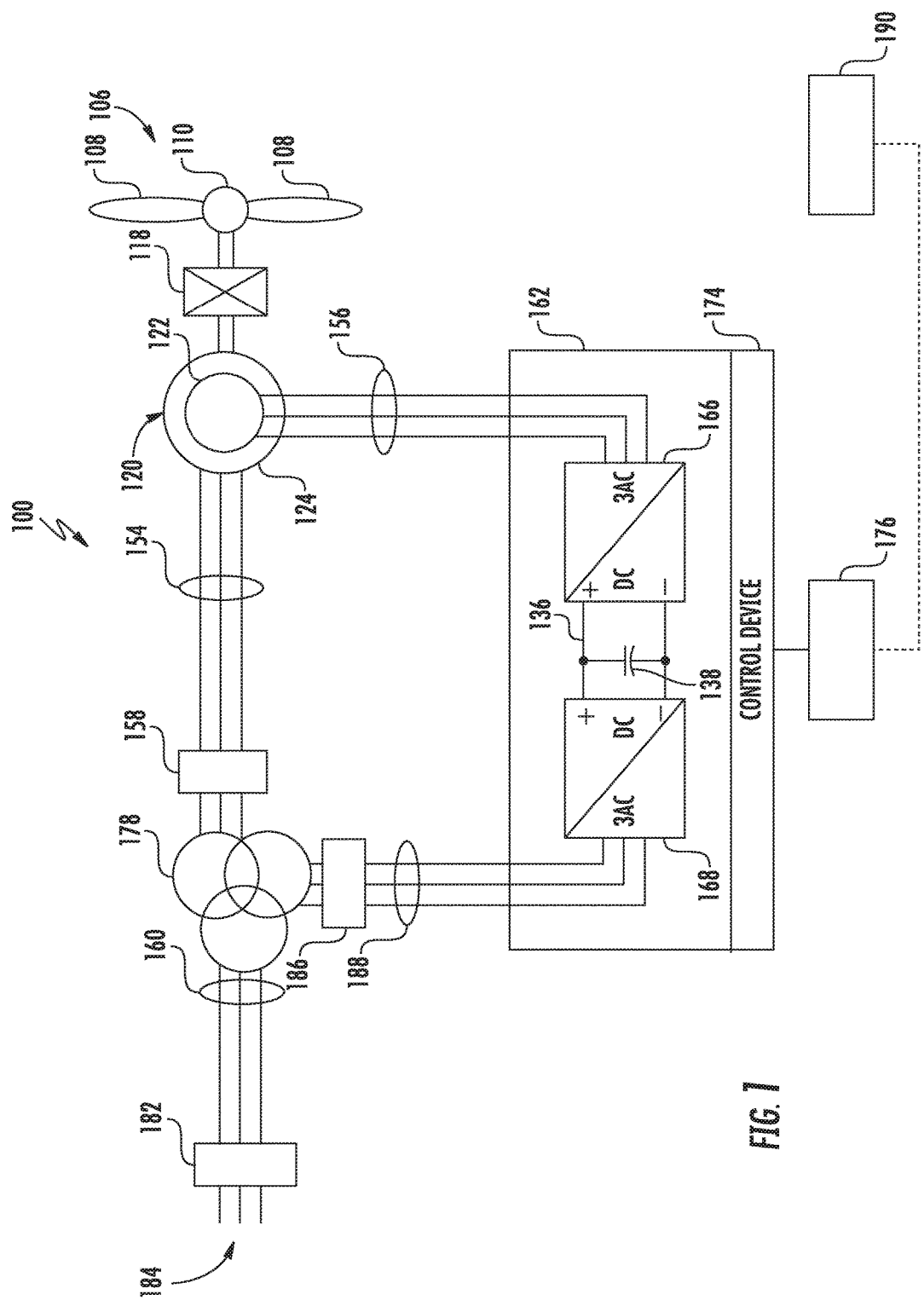
FIG. 1 illustrates a schematic diagram of one embodiment of a DFIG wind turbine system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to systems and methods for generating and communicating maximum available active and reactive power capabilities of a DFIG wind turbine system in a wind farm to a farm-level controller of the wind farm. In a wind farm, the wind is not pushed consistently across the farm at any instant in time but rather some turbines experience high wind at one moment in time while other turbines experience less wind at that same time. As such, the present disclosure is directed to a control method that enables the wind turbines that experience high wind to output maximum real power (P) at a level that is at or even above their nameplate rating (i.e. by minimizing their reactive power (Q) output and/or by increasing turbine terminal voltage), without exceeding the electrical constraints of the wind turbine (e.g. transformer size, power cabling size, protective sizing etc.). Meanwhile, the wind turbines that experience lower wind are configured to provide more of the required reactive capability of the wind farm.

Various wind turbines in the wind farm can also be controlled independently to adjust their reactive power outputs to regulate various voltages within the wind farm. Thus, the farm-level controller of the wind farm is configured to maximize its instantaneous real power output capability to maximize the farm AEP while maintaining the ability to generate the required reactive power. In addition, optimizing the reactive power distribution within the wind turbine electrical system via controls and fully utilizing the reactive power capability of the line side converter is configured to increase the available capacity within the generator design for real power generation of the turbine system.

To support this capability, the control method of the present disclosure may also incorporate the various sources of reactive power and optimize the control means to maximize the available reactive power from the wind turbine. Such reactive power sources may include the DFIG generator VAR amplification factor, the actual DFIG generator VAR capability (rather than a specified and thus limited VAR capability), and the converter's line side VAR capability. The instantaneous operating temperature and the installation altitude of each turbine are also considered to extend the capability of the wind turbine. Thus, the generator capability curve of the DFIG generator of the present disclosure is not flat at the top and the bottom, but rather, varies as a function of the operating RPM, voltage, and temperature.

Referring now to the drawings, FIG. 1 illustrates one embodiment of a wind-driven doubly-fed induction generator (DFIG) wind turbine system 100 according to the present disclosure. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other power systems, such as synchronous, asynchronous, permanent magnet, and full-power conversion wind turbines, solar, gas turbine, or other suitable power generation systems.

In the example system 100, a rotor 106 includes a plurality of rotor blades 108 coupled to a rotating hub 110. The rotor 106 is coupled to an optional gearbox 118, which is, in turn, coupled to a generator 120. In accordance with aspects of the present disclosure, the generator 120 is a doubly fed induction generator (DFIG) 120.

The DFIG 120 can include a rotor and a stator. Further, as shown, the DFIG 120 is typically coupled to a stator bus 154 and a power converter 162 via a rotor bus 156. The stator bus 154 provides an output multiphase power (e.g. three-phase power) from a stator of the DFIG 120 and the rotor bus 156 provides an output multiphase power (e.g. three-phase power) of a rotor of the DFIG 120. Referring to the power converter 162, the DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) or similar switching elements. The rotor side converter 166 and the line side converter 168 can be coupled via a DC link 136 across which is the DC link capacitor 138. In an embodiment, a transformer 178, such as a three-winding transformer, can be coupled to the line bus 188, the stator bus 154, and a system bus 160. The transformer 178 can convert the voltage of power from the line bus 188 and the stator bus 154 to a voltage suitable for providing to an electrical grid 184 via system bus 160.

The power conversion system 162 can be coupled to a control device 174 to control the operation of the rotor side converter 166 and the line side converter 168. It should be noted that the control device 174, in typical embodiments, is configured as an interface between the power conversion system 162 and a control system 176. In one implementation, the control device 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and other aspects of the wind turbine system 100.

In operation, alternating current power generated at the DFIG 120 by rotation of the rotor 106 is provided via a dual path to electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line side converter 168 converts the DC power on the DC link 136 into AC output power suitable for the electrical grid 184, such as AC power synchronous to the electrical grid 184, which can be transformed by the transformer 178 before being provided to the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz/60 Hz).

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Various circuit breakers and switches, such as a line bus breaker 186, stator bus breaker 158, and grid breaker 182 can be included in the system 100 to connect or disconnect corresponding buses, for example, when current flow is excessive and can damage components of the wind turbine system 100 or for other operational considerations. Additional protection components can also be included in the wind turbine system 100.

Figure 2:
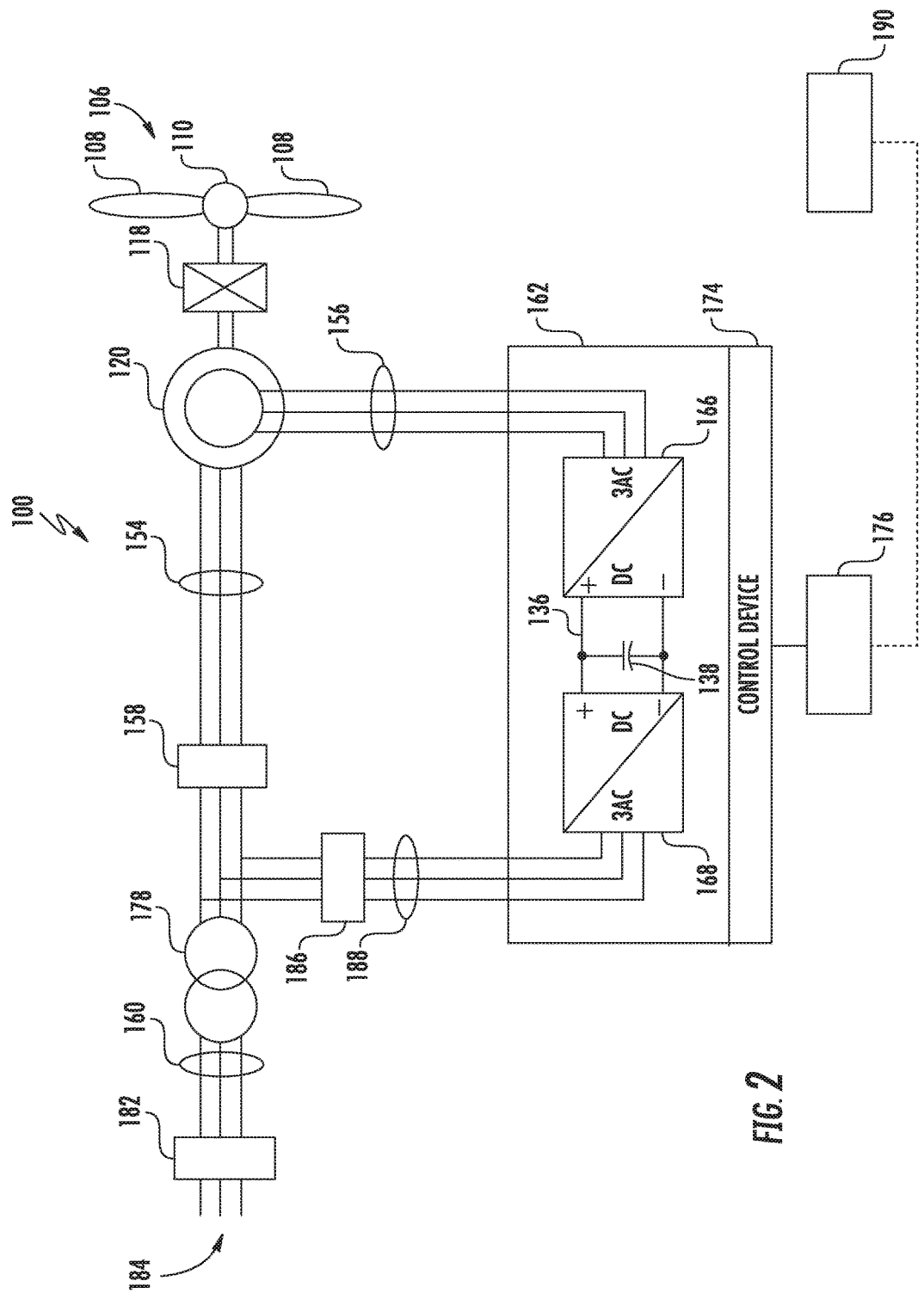
FIG. 2 illustrates a schematic diagram of another embodiment of a DFIG wind turbine system according to the present disclosure.

Referring now to FIG. 2, an alternate implementation of a DFIG wind turbine system 100 according to additional example aspects of the present disclosure is illustrated. Elements that are the same or similar to those as in FIG. 1 are referred to with the same reference numerals. As shown, in some implementations, a stator of a DFIG 120 can be coupled to a stator bus 154, which can be coupled to line bus 188. Power from power converter 162 can be combined with power from stator bus 154, and provided to transformer 178 coupled to a to system bus 160. In some implementations, as shown, the transformer 178 can be a two-winding step-up transformer or an isolation transformer. Further, as shown, the system bus 160 can be coupled to the electrical grid 184. In some implementations, a plurality of DFIG wind turbine systems 100 can be coupled together in a cluster, and power from the cluster of DFIG wind turbine systems 100 can be provided to a cluster transformer (not shown) before power is provided to electrical grid 184.

Figure 3:
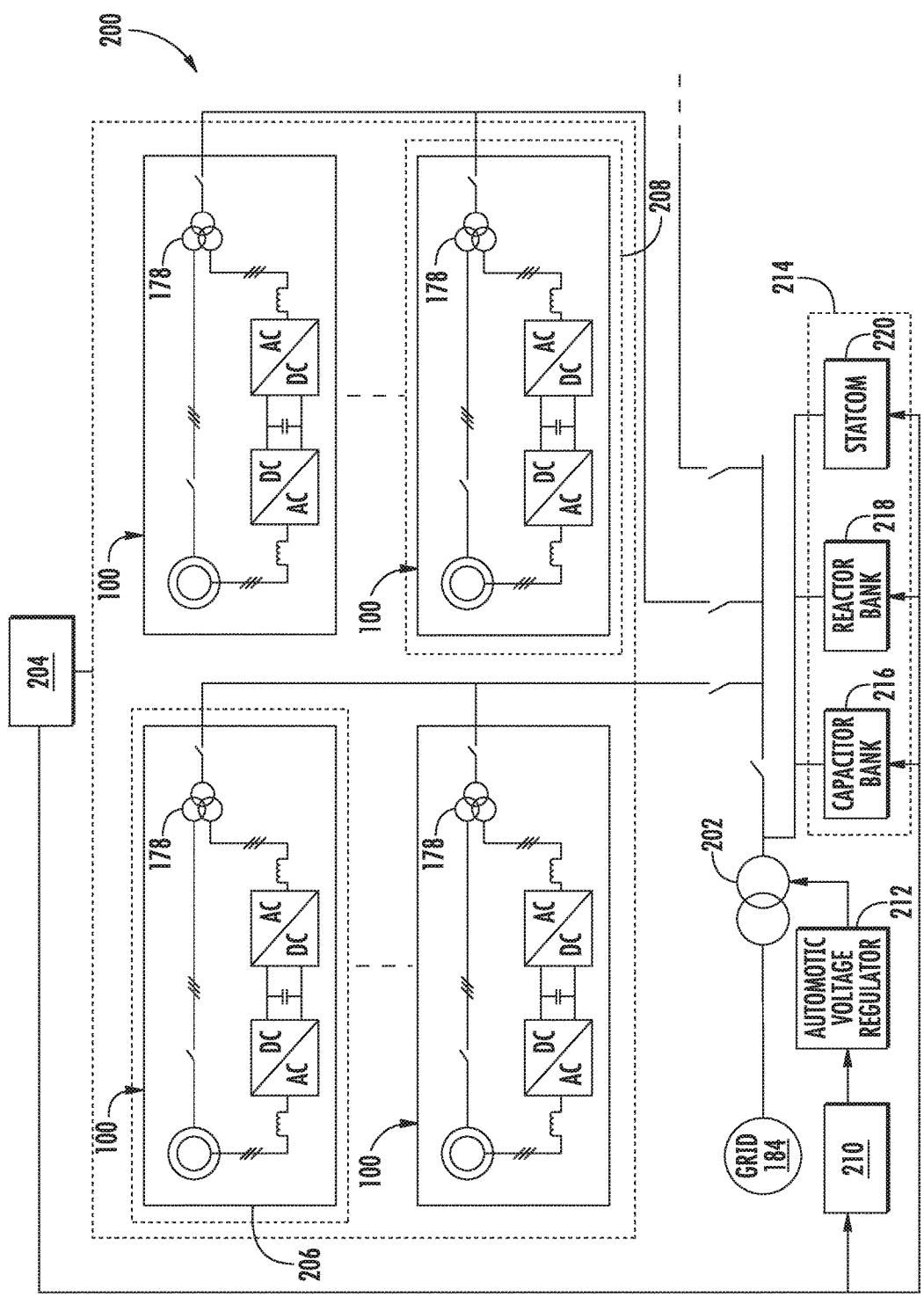
FIG. 3 illustrates a schematic diagram of one embodiment of a wind farm having a plurality of wind turbines according to the present disclosure.

Referring now to FIG. 3, the wind turbines 100 may be arranged together in a common geographical location as a wind farm 200 and connected to the power grid 184. More specifically, as shown, each of the wind turbines 100 may be connected to the power grid 184 via a main transformer 178. Further, as shown, the wind farm 200 may be connected to the power grid 184 via a substation transformer 202. Thus, as shown, the wind farm 200 may also include a transformer controller 210, an automatic voltage regulator (e.g. a tap changer), and/or one or more reactor power devices 214. For example, the reactor power devices 214 may include any one of the following: a capacitor bank 216, a reactor bank 218, and/or a static synchronous compensator (STATCOM) 220.

Figure 4:
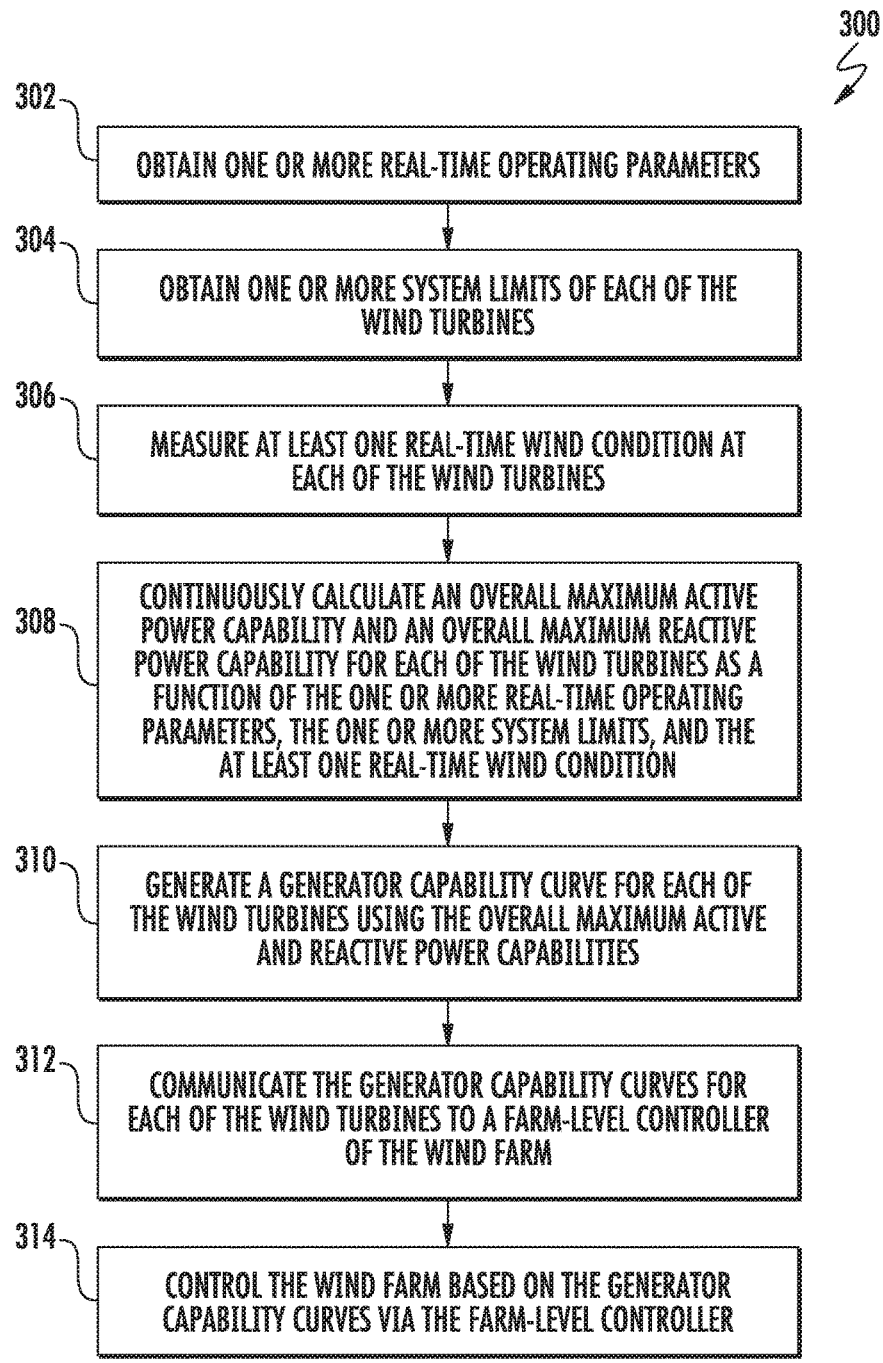
FIG. 4 illustrates a flow diagram of one embodiment of a method for dynamically controlling real and reactive power capability of a wind farm having a plurality of wind turbines according to the present disclosure.

Referring now to FIG. 4, a flow diagram of an example method 300 for dynamically controlling real and reactive power capability of the wind farm 200 is illustrated. The method 300 can be implemented by a control device and/or control system, such as a control device 174 or control system 176 depicted in FIG. 1 or the control device/system 510 depicted in FIG. 5. In addition, FIG. 4 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at 302, the method 300 can include obtaining one or more real-time operating parameters of each of the wind turbines 100 of the wind farm 200. In certain embodiments, the real-time operating parameter(s) may include an operating rotations per minute (RPM) of one of the wind turbines 100, temperature, power, altitude, current, voltage, or any other suitable operating parameter. For example, the control device 174 can be operatively connected to one or more sensors, such as one or more voltage, current, power, temperature, or DFIG rotational speed sensors, and can be configured to receive measurements indicative of one or more operating parameters of the wind farm 200. In some implementations, the control device 174 can be configured to determine one or more operating parameters based on one or more operating parameters obtained from one or more sensors.

As shown at 304, the method 300 includes obtaining one or more system limits of each of the wind turbines 100 in the wind farm 200. For example, in certain embodiments, the system limit(s) may include an electrical limitation of a component of one of the wind turbines 100 (e.g. voltage, current, etc.), a sizing limitation of a component of one of the wind turbines 100 (transformer size, power cabling size, protective sizing, etc.), VAR gain, a predefined reactive power capability, or predefined a real power capability.

As shown at 306, the method 300 includes measuring at least one real-time wind condition at each of the wind turbines 100. For example, in one embodiment, the real-time wind condition(s) may correspond to wind speed, wind turbulence, wind gusts, wind direction, wind acceleration, wind shear, wind veer, wake, or any other wind parameter. Further, as mentioned, the control device 174 can be operatively connected to one or more sensors, such as one or more wind sensors, and can be configured to receive measurements indicative of various wind conditions in the wind farm 200.

As shown at 308, the method 300 includes continuously calculating an overall maximum active power capability and an overall maximum reactive power capability for each of the wind turbines 100 in the wind farm 200 as a function of the real-time operating parameter(s), the system limit(s), and the real-time wind speed. More specifically, in one embodiment, the maximum active and reactive power capabilities may be calculated instantaneously. In alternative embodiments, the maximum active and reactive power capabilities may be calculated at predefined regular intervals.

In particular embodiments, the control device 174 can use a current operating parameter, a voltage operating parameter, a temperature operating parameter, or other operating parameters, as well as the system limit(s) and real-time wind speed to determine the overall reactive power capability (i.e., a maximum capacity of a reactive power source to produce reactive power) at a particular point in time. Using a look-up table or a calculation, the reactive power capability can be determined by the control device 174 based on the amount of active power being produced by the active and reactive power source, e.g. the DFIG 120. In some implementations, the reactive power capability can further be determined based on other parameters, such as an operating temperature of the component, one or more voltage or current limits for the component, or other operating parameters.

For example, in one embodiment, the control device 174 is configured to calculate maximum active and reactive power capabilities for the line side converter 168 of the power converter 162 and maximum active and reactive power capabilities for the rotor side converter 166 of the power converter 162. More specifically, in one embodiment, when calculating the maximum reactive power capabilities for the rotor side converter 166, the control device 174 may take into account all sources of reactive power from each individual turbine 100, which may include, for example, the actual DFIG generator VAR capability, the generator VAR amplification factor, the line side converter VAR capability, and the instantaneous operating temperature and installation altitude of each turbine. For example, a DFIG exhibits a capability to amplify the reactive power generator by the stator 124 via the rotor 122. The level of amplification is a function of the design of the DFIG 120 and the operating RPM. The gain from the rotor 122 to the stator 124 is a function of the operating RPM.

Thus, the control device 174 can then calculate the overall maximum active and reactive power capabilities for the wind turbines 100 in the wind farm 200 based on the maximum active and reactive power capabilities for the line side converter 168 and the maximum active and reactive power capabilities for the rotor side converter 166, as well as the generator 120 capability. In such embodiments, the control device 174 can use any combination of current, voltage, temperature, etc. from the line side and rotor side converters 166, 168 and/or the generator 120, as well as system limit(s) and real-time wind speed to determine the overall reactive power capability (i.e., a maximum capacity of a reactive power source to produce reactive power) at a particular point in time.

Referring still to FIG. 4, as shown at 310, the method 300 includes generating a generator capability curve for each of the wind turbines 100 using the overall maximum active and reactive power capabilities and a power curve. More specifically, as used herein, a generator capability curve (also commonly referred to as a D-curve) generally refers to a curve of that represents active and reactive output limits of a system. Conventional generator capability curves often use rectangle or flat constraints for active and reactive output limits. The generator capability curves of the present disclosure, however, exhibit curved constraints that vary as a function of operating speed (RPM).

As shown at 312, the method 300 includes communicating the generator capability curves for each of the wind turbines 100 to a farm-level controller 204 (FIG. 4) of the wind farm 200. In alternative embodiments, the method 300 may include communicating the information contained in the generator capability curves in a different format, e.g. a set of vectors including controllable operating conditions along with expected capability, an expected change to present operating state or capability, and/or any other function indicating improved capability.

As shown at 314, the method 300 includes controlling the wind farm 200 based on the generator capability curves via the farm-level controller 204, one or more tap changer settings of the tap changer 212, or settings of the reactive power device(s) 214 of the wind farm 200. More specifically, in one embodiment, the control device 174 may compare the wind speed at each of the wind turbines 100 to a predetermined threshold. The wind speed at each individual wind turbine 100 may be measured or the wind turbines 100 may be divided into one or more sets 206, 208 of wind turbines, as shown in FIG. 3, and the wind speed can be measured for each set. It should be understood, however, that the first and second sets 206, 208 of wind turbines 100 described herein may include one or more wind turbines 100. As such, if the wind speed for a first set 206 (FIG. 3) of wind turbines 100 (or a single wind turbine 100) in the wind farm 200 is above the predetermined threshold, the control device 174 is configured to maximize an active power output for the first set 206 of wind turbines 100 based on the associated generator capability curves. In particular embodiments, the step of maximizing the active power output for the first set 206 of wind turbines 100 may include minimizing a reactive power output of the first set 206 of wind turbines 100 and adjusting at least one voltage or current applied to the rotor 122 of the DFIG 120 of the first set 206 of wind turbines 100.

In contrast, if the wind speed for a second set 208 of wind turbines 100 is below the predetermined threshold, the control system 176 and/or the control device 174 is configured to maximize a reactive power output of the second set 208 of wind turbines 100 based on the associated generator capability curves to achieve at least a portion of a reactive power production requirement for the wind farm 200. For example, in one embodiment, the control system 176 and/or the control device 174 may maximize the reactive power output of the second set 208 of wind turbines 100 by adjusting a phase of a voltage of the rotor 122 of the DFIG of the second set 208 of wind turbines 100. More specifically, the control system 176 and/or the control device 174 can control a switching cycle of line side converter 168 of each of the wind turbines 100 in order to produce reactive power. For example, the control system 176 and/or the control device 174 can control a switching behavior of line side converter 168 such that a current from the line side converter 168 comes into or out of phase with a sinusoidal voltage of the electrical grid 184 in order to produce or absorb reactive power. Similarly, the control system 176 and/or the control device 174 can control a switching cycle of rotor side converter 166 in order to produce or absorb reactive power from the DFIG 120.

The reactive power production requirement as described herein can be a reactive power production set point received from a control system, such as an external control system 190 (e.g., utility dispatch control system). For example, the wind turbines 100 can be dispatched to provide reactive power in order to support the electrical grid 184. The control device 174 can be configured to receive the reactive power production requirement by, for example, receiving a command indicative of the reactive power production requirement from the control system 190. Thus, the control device 174 can control the wind farm 200 based, at least in part, on the reactive power production requirement. For example, the control device 174 can control each of the wind turbines 100 such that the combined reactive power production therefrom meets the reactive power production requirement.

In further embodiments, the step of controlling the wind farm 200 based on the generator capability curves may include independently adjusting reactive power outputs of each of the plurality of wind turbines 100 to regulate predetermined voltages in the wind farm 200.

Figure 5:
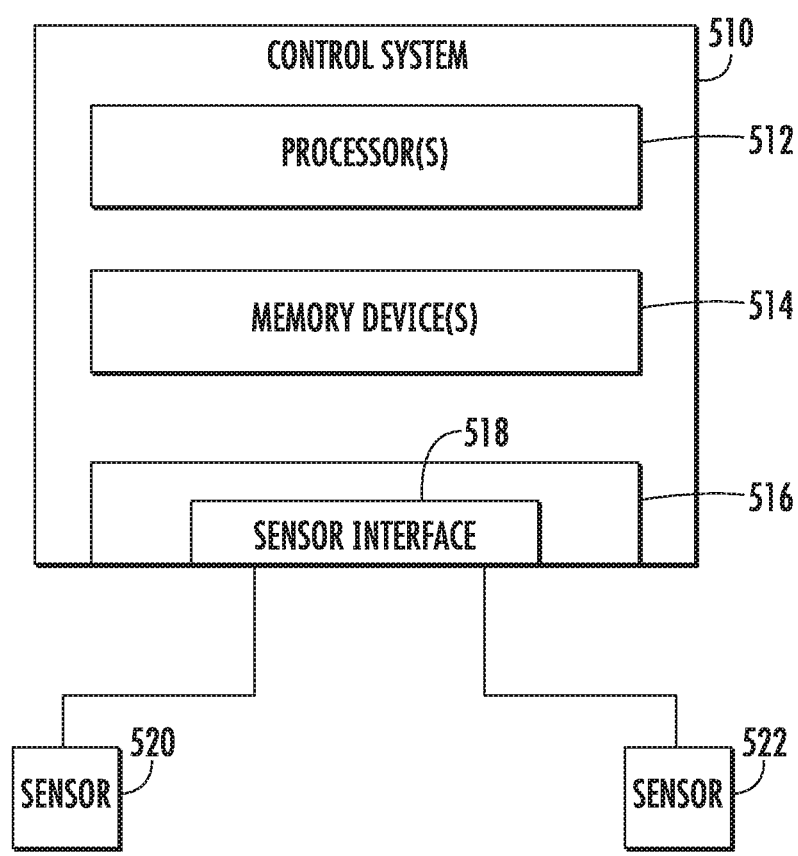
FIG. 5 illustrates an example control device according to example aspects of the present disclosure.

FIG. 5 illustrates an example control device/system 510 according to example embodiments of the present disclosure. The control device/system 510 can be, for example, a control device 174 or a control system 176, and can be associated with an individual wind turbine system, a wind farm (e.g., a cluster-level or farm-level control device) and/or can include one or more control devices associated with aspects of a wind turbine system, such as one or more control devices configured to control a power converter 162. In some embodiments, the one or more control devices 510 can include one or more processor(s) 512 and one or more memory device(s) 514. The processor(s) 512 and memory device(s) 514 can be distributed so that they are located at one more locales or with different devices.

The processor(s) 512 and memory device(s) 514 can be configured to perform a variety of computer-implemented functions and/or instructions (e.g., performing the methods, steps, calculations and the like and storing relevant data as disclosed herein). The instructions when executed by the processor(s) 512 can cause the processor(s) 512 to perform operations according to example aspects of the present disclosure. For instance, the instructions when executed by the processor(s) 512 can cause the processor(s) 512 to implement the methods discussed herein.

Additionally, the control device 510 can include a communication interface 516 to facilitate communications between the control device 510 and various components of a wind turbine system, wind farm, or power system, including reactive power production requirements or sensed operating parameters as described herein. Further, the communication interface 518 can include a sensor interface 518 (e.g., one or more analog-to-digital converters) to permit signals transmitted from one or more sensors 520, 522 to be converted into signals that can be understood and processed by the processor(s) 512. It should be appreciated that the sensors (e.g. sensors 520, 522) can be communicatively coupled to the communications interface 518 using any suitable means, such as a wired or wireless connection. The signals can be communicated using any suitable communications protocol. The sensors (520, 522) can be, for example, voltage sensors, current sensors, power sensors, DFIG rotational speed sensors, temperature sensors, or any other sensor device described herein.

As such, the processor(s) 512 can be configured to receive one or more signals from the sensors 520, 522. For instance, in some embodiments, the processor(s) 512 can receive signals indicative of a voltage or current from the sensor 520. In some embodiments, the processor(s) 512 can receive signals indicative of temperature (e.g. DFIG temperature, line side converter temperature) from sensor 522.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 514 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 514 can generally be configured to store suitable computer-readable instructions that, when implemented by the processor(s) 512, configure the control device 510 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for dynamically controlling real and reactive power capability of a wind farm having a plurality of wind turbines, each of the plurality of wind turbines having a Doubly-Fed Induction Generator (DFIG) and a power converter, the power converter having a line side converter and a rotor side converter, the control method comprising:

obtaining, by a control device, comprising one or more processors and one or more memory devices, one or more real-time operating parameters of each of the wind turbines;

obtaining, by the control device, one or more system limits of each of the wind turbines;

measuring, via one or more sensors, at least one real-time wind condition at each of the wind turbines;

continuously calculating, by the control device, an overall maximum active power capability and an overall maximum reactive power capability for each of the wind turbines as a function of the one or more real-time operating parameters, the one or more system limits, and the at least one real-time wind condition;

generating, by the control device, a generator capability curve for each of the wind turbines using the overall maximum active and reactive power capabilities;

communicating the generator capability curves for each of the wind turbines to a farm-level controller of the wind farm; and, controlling, via the farm-level controller, the wind farm based on the generator capability curves.

2. The control method of claim 1, further comprising controlling the wind farm via the farm-level controller based on at least one of one or more tap changer settings or reactive power device settings of the wind farm, the reactive power device comprising at least one of a capacitor bank, a reactor bank, or a static synchronous compensator (STATCOM).

3. The control method of claim 1, wherein continuously calculating the overall maximum active power capability and the overall maximum reactive power capability for the one or more wind turbines further comprises:

calculating a maximum active power capability and a maximum reactive power capability for a line side converter of the power converter;

calculating a maximum active power capability and a maximum reactive power capability for a rotor side converter of the power converter; and, calculating the overall maximum active power capability and the overall maximum reactive power capability for the one or more wind turbines based on the maximum active and reactive power capabilities for the line side converter and the maximum active and reactive power capabilities for the rotor side converter.

4. The control method of claim 3, wherein calculating the maximum active power capability and the maximum reactive power capability for the rotor side converter of the power converter further comprises incorporating at least one of an actual generator reactive power capability, a generator reactive power amplification factor, or a line side converter reactive power capability in the calculation.

5. The control method of claim 1, further comprising calculating the maximum active power capability and the maximum reactive power capability instantaneously.

6. The control method of claim 1, further comprising calculating the maximum active power capability and the maximum reactive power capability at predefined regular intervals.

7. The control method of claim 1, wherein controlling the wind farm based on the generator capability curves further comprises:

comparing the at least one wind condition for each of the wind turbines to a predetermined threshold;

if the at least one wind condition for a first set of wind turbines in the wind farm is above the predetermined threshold, maximizing an active power output for the first set of wind turbines based on the associated generator capability curves; and, if the at least one wind condition for a second set of wind turbines is below the predetermined threshold, maximizing a reactive power output of the second set of wind turbines based on the associated generator capability curves to achieve at least a portion of a reactive power production requirement for the wind farm, the first and second sets of wind turbines each comprising one or more wind turbines.

8. The control method of claim 7, wherein maximizing the active power output for the first set of wind turbines based on the associated generator capability curves further comprises minimizing a reactive power output of the first set of wind turbines and adjusting at least one voltage or current applied to a rotor of the DFIG of the first set of wind turbines.

9. The control method of claim 8, wherein maximizing the reactive power output of the second set of wind turbines based on the associated generator capability curves further comprises adjusting a phase of a voltage of the rotor of the DFIG of the second set of wind turbines.

10. The control method of claim 1, wherein generating the generator capability curve for each of the wind turbines using the overall maximum active and reactive power capabilities further comprises:

selecting an operating point on a power curve;

generating the generator capability curve for each of the wind turbines using the overall maximum active and reactive power capabilities and the operating point.

11. The control method of claim 1, wherein controlling the wind farm based on the generator capability curves further comprises independently adjusting reactive power outputs of each of the plurality of wind turbines to regulate predetermined voltages in the wind farm.

12. The control method of claim 1, wherein the one or more real-time operating parameters comprise at least one of an operating rotations per minute (RPM) of one or more of the plurality of wind turbines, temperature, power, altitude, current, or voltage.

13. The control method of claim 1, wherein the one or more system limits comprise at least one of an electrical limitation of a component of one of the wind turbines, a sizing limitation of a component of one of the wind turbines, VAR gain, a predefined reactive power capability, or a predefined real power capability.

14. The control method of claim 1, wherein the at least one real-time wind condition comprises at least one of wind speed, wind turbulence, wind gusts, wind direction, wind acceleration, wind shear, wind veer, or wake.

15. A control system for a wind turbine, the wind turbine having a Doubly-Fed Induction Generator (DFIG) and a power converter, the power converter having a line side converter and a rotor side converter, the control system comprising:

one or more processors and one or more memory devices, the control system configured to perform one or more operations, the one or more operations comprising:

obtaining one or more real-time operating parameters of each of the wind turbines;

obtaining one or more system limits of each of the wind turbines;

obtaining at least one real-time wind condition at each of the wind turbines;

continuously calculating an overall maximum active power capability and an overall maximum reactive power capability for each of the wind turbines as a function of the one or more real-time operating parameters, the one or more system limits, and the at least one real-time wind condition;

generating a generator capability curve for each of the wind turbines using the overall maximum active and reactive power capabilities;

communicating the generator capability curves for each of the wind turbines to a farm-level controller of the wind farm.

16. The control system of claim 15, wherein continuously calculating the overall maximum active power capability and the overall maximum reactive power capability for the one or more wind turbines further comprises:

calculating a maximum active power capability and a maximum reactive power capability for a line side converter of the power converter;

calculating a maximum active power capability and a maximum reactive power capability for a rotor side converter of the power converter; and, calculating the overall maximum active power capability and the overall maximum reactive power capability for the one or more wind turbines based on the maximum active and reactive power capabilities for the line side converter and the maximum active and reactive power capabilities for the rotor side converter.

17. The control device of claim 16, wherein calculating the maximum active power capability and the maximum reactive power capability for the rotor side converter of the power converter further comprises incorporating at least one of an actual generator reactive power capability, a generator reactive power amplification factor, or a line side converter reactive power capability in the calculation.

18. The control system of claim 15, further comprising calculating the maximum active power capability and the maximum reactive power capability instantaneously.

19. The control system of claim 15, further comprising calculating the maximum active power capability and the maximum reactive power capability at predefined regular intervals.

20. The control system of claim 15, wherein the one or more real-time operating parameters comprise at least one of an operating rotations per minute (RPM) of the wind turbine, temperature, power, altitude, current, or voltage, the one or more system limits comprising at least one of an electrical limitation of a component of one of the wind turbines, a sizing limitation of a component of one of the wind turbines, VAR gain, a predefined reactive power capability, or a predefined real power capability, and the at least one real-time wind condition comprising at least one of wind speed, wind turbulence, wind gusts, wind direction, wind acceleration, wind shear, wind veer, or wake.

* * * * *